July 13, 1926.
C. H. WILLS
BEARING LOCATING DEVICE
Filed Nov. 3, 1920
1,592,586
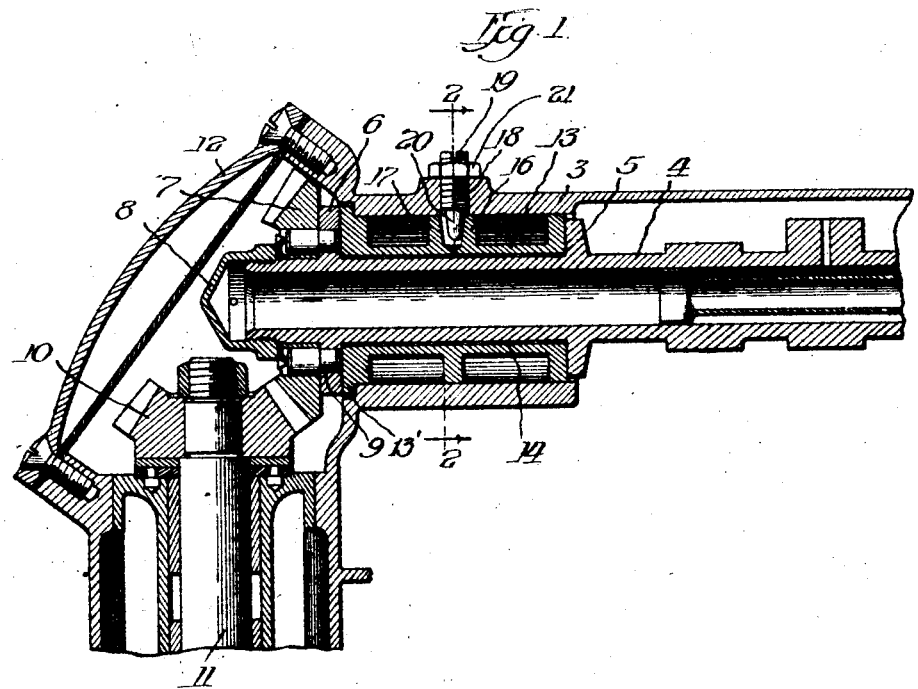
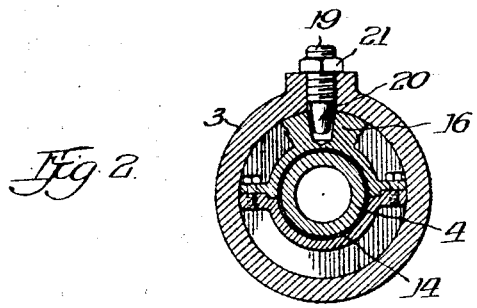
Inventor
C Harold Wills Patented July 13, 1926.

1,592,586

UNITED STATES PATENT OFFICE.

CHILDE HAROLD WILLS, OF MARYSVILLE, MICHIGAN.

BEARING-LOCATING DEVICE.

Application filed November 3, 1920. Serial No. 421,550.

This invention relates to a new and improved method and construction whereby a bearing may be readily located and adjusted into its seat. More specifically, my device comprises an adjustable cam means whereby a bearing of the type adapted for use with rotating shafts, may be adjusted and moved into its seat in a direction axially of the shaft. In the use of such bearings it is highly important that the bearings when put in place, be adjusted relative to the shaft housing or supporting members in such manner that the shaft is properly located for its purpose, and that there be no play of the shaft relative to the bearing or the housing. This is particularly true where gears are carried by the shaft, since slight variation in the location of the gear may cause the gear to be noisy and inefficient and to wear the coacting gear.

It is an object of the present invention to provide a simple and effective means for locating a bearing in a shaft support or housing, and more particularly to provide cam means whereby the bearing may be moved positively into its seat. It is also an object to provide a device of the character described, in which the adjustment of the bearing into its seat may be readily accomplished and in which means are provided for retaining the bearing in the seated position. Other and further objects will appear as the description proceeds.

My invention is particularly applicable to the cam shafts of internal combustion engines, and, in the particular embodiment which has been shown for the purposes of illustration, the invention has been applied to a shaft of that character having a driven beveled gear thereon, the gear being in engagement with a driving beveled gear. In a shaft of this character having an interfitted relation with the bearing adapted to prevent relative axial movement between the bearing and shaft, it is particularly important that means be provided to adjust the bearing in its support in the direction axially of the shaft, in order that the proper relation of the intermeshing beveled gears may be secured.

This particular embodiment has been shown in the accompanying drawings in which—

Figure 1 is a fragmentary longitudinal section showing a portion of a cam shaft and housing with my invention applied thereto; and, Figure 2 is a section taken on a line 2—2 of Figure 1.

In the drawings the housing or support is designated 3 and it encloses and supports the bearing for the cam shaft 4. The cam shaft 4 is provided with the spaced shoulders 5 and 6 and carries a beveled gear 7 which is held against the shoulder 6 by the cap 8 the gear being restrained against rotation relative to the shaft by the dowels 9. This gear 7 coacts with a gear 10 carried by the shaft 11. The gears are made accessible by the removable cover 12. The bearing 13 is shown surrounding the shaft 4 and interfitting between the spaced shoulders 5 and 6. This bearing as best shown in Figure 2, is formed of two interfitting members split longitudinally in order that it may be fitted to the shaft, and it carries the Babbitt facing 14.

The bearing 13 is provided with an enlargement 16 having a conical recess 17 therein and the casing 3 has a screw threaded opening 18 located in such manner as to partially register with cavity 17 when the bushing 13 is properly adjusted. An adjusting screw 19 having a conical lower end 20 is threaded into this opening, its conical end engaging the similar conical opening 17 in the bushing 13, the engagement of these two surfaces serving to move the bushing in the direction longitudinally of the shaft. The screw 19 is retained in adjusted position by a lock nut 21 as shown.

In the case of this bearing and its adjusting or locating means, the split bearing 13 is first seated upon the shaft 4 between the shoulders 5 and 6, the two portions of the bearing being secured together by screws as shown in Figure 2. The cam shaft and bearing are then slipped into place in the housing 3 and the screw 19 adjusted until the inner face of the enlarged portion 13' of the bearing is brought up against the face of the housing. The shaft is then correctly located and the gears will mesh properly.

By the use of a bearing having an adjusting and locking means of the type shown and described herein, the cam shaft may be readily longitudinally adjusted in its proper position in the cam shaft housing and any play or lost motion between the pinions may thus be avoided. The structure is simple and may be readily applied. Its adjustment can be quickly accomplished without the use of special tools and the adjustment once secured, can be positively maintained.

While I have described more or less precisely the details of construction of my invention, I do not wish to be understood as limiting myself thereto, as I contemplate changes in form and the proportion of parts and substitution of equivalents as circumstances may suggest or render expedient, without departing from the spirit of my invention.

I claim:

1. A shaft, a support therefor, a bearing for said shaft mounted in the support, the bearing interfitting between spaced shoulders upon the shaft, and means adapted to move the bearing and thereby the shaft relative to the support.

2. A shaft, a support therefor, a bearing for said shaft mounted in the support, the bearing interfitting between spaced shoulders upon the shaft, a conical cavity in the outer surface of the bearing, a stud threaded through the support and adapted to be moved to coact with the cavity to move the bearing axially, and means to lock the stud in position, the movement of the bearing serving to move the shaft longitudinally through contact of the bearing with the shoulders on the shaft.

3. A shaft, a support therefor, a bearing for said shaft mounted in the support, and means adapted to move the bearing relative to the support and to retain it in position, the bearing having a shoulder adapted to engage the support to limit relative movement therebetween.

4. A shaft, a support therefor, a bearing for said shaft mounted in the support, the bearing interfitting between spaced shoulders upon the shaft, and means adapted to move the bearing and thereby the shaft relative to the support, the bearing having a shoulder adapted to be brought into engagement with the support to limit relative movement therebetween.

5. A shaft, a support therefor, a bearing for said shaft mounted in the support, the bearing interfitting between spaced shoulders upon the shaft, a conical cavity in the outer surface of the bearing, a stud threaded through the support and adapted to be moved to coact with the cavity to position the bearing, and means to lock the stud in position, the movement of the bearing serving to move the shaft longitudinally through contact of the bearing with the shoulders on the shaft, the bearing having an enlarged circumferential shoulder adapted to be brought into engagement with a face of the support when the bearing is properly seated in the support.

Signed at Marysville, Michigan, this 19 day of October, 1920.

CHILDE HAROLD WILLS.